3,287,295
ALKYD RESINS FROM POLYHYDRIC ALCOHOLS OF AT LEAST FOUR HYDROXYLS, POLYCARBOXYLIC ACIDS, STYRENE/ALLYL ALCOHOL COPOLYMERS, AND ALKYD MODIFIERS
Frank J. Hahn, Springfield, Mass., assignor to Monsanto Company, a corporation of Delaware
No Drawing. Filed Mar. 30, 1962, Ser. No. 183,764
5 Claims. (Cl. 260—22)

This invention relates to modified alkyd resins and to the process of preparing the same. More particularly, this invention relates to the preparation of short to medium oil-modified alkyd resins.

Alkyd resins are generally prepared from polybasic acids, polyhydric alcohols and fatty acids or oils. The fatty material serves to increase film flexibility and solubility, but in turn tends to decrease early film hardness as the fatty content is increased. In recent years, improved processing knowledge has increased the use of pentaerythritol and higher non-resinous polyhydric alcohols in long oil alkyd resins. Absence of secondary hydroxyl groups in high polyhydric alcohols, e.g., pentaerythritol, over previous compounds that had been generally used, e.g., glycerine, served to improve gloss, color retention and weatherability of surface coating prepared from alkyd resins containing the same. Of probably more importance, the higher functionality of the higher polyhydric alcohols generally increases the viscosity development of the alkyd resin. Unfortunately, this latter effect also tends to cause gelation during preparation. To minimize this tendency, the higher functionality is generally compensated by increasing the proportional quantity of fatty acids or oil in the alkyd. Such an increase in oil content generally results in alkyds of low cure response, limited largely to use in air-dry architectural finishes and excluded from industrial baking finishes. Other compensating methods such as the use of lower functional diols or non-fatty monobasic acids cancel the beneficial effect of higher polyols.

Accordingly, it is an object of this invention to improve the physical and chemical properties of short to medium oil-modified alkyd resins.

Another object of this invention is to provide a short to medium oil alkyd resin having the improved gloss, color retention and weatherability of a pentaerythritol and/or higher polyhydric alcohol-based alkyd.

Another object of this invention is to provide a short to medium oil-modified alkyd resin having the advantages of alkyds prepared with higher non-resinous polyols without the sacrifice in properties that would result by compensation with lower functional compounds to avoid gelation.

A further object of this invention is to provide a short to medium oil alkyd resin having the properties of a pentaerythritol and/or higher polyhydric alcohol-based alkyd resin with additional superior properties equal to or better than corresponding epoxy esters in water, detergent, chemical and corrosion resistance.

These and other objects are attained by reacting 3 to 25% by weight of a non-resinous polyhydric alcohol having a functionality of at least 4 hydroxyl groups, 5 to 40% by weight of a polycarboxylic acid and/or an anhydride thereof, 10 to 60% by weight of a styrene-allyl alcohol copolymeric polyol and between 25 to 60% by weight of an alkyd modifier selected from the group consisting of fatty acids, mono- and higher esters between polyhydric alcohols and fatty acids, triglycerides and mixtures of the same.

The following examples are given to illustrate the invention and are not intended as limitations thereof, and unless otherwise specified, quantities are mentioned on a weight basis.

*Example 1*

| Formula | Parts by Weight | | |
|---|---|---|---|
| | #1 | #2 | #3 |
| Soya Oil | 340.5 | 340.5 | 340.5 |
| Pentaerythritol | 70.8 | 44.8 | 38.7 |
| Phthalic Anhydride | 148 | 148 | 148 |
| Styrene-Allyl Alcohol Copolymer (equivalent weight=300±15) | 150 | 400 | 550 |
| Litharge | 0.17 | 0.17 | 0.17 |
| Water Loss (theoretical) | 18 | 18 | 18 |
| Yield (theoretical) | 691.47 | 915.47 | 1,048.87 |

The process steps used for the three formulations above are carried out in a heated, agitated reaction vessel. The following process steps are carried out in sequence:

| Process | #1 | #2 | #3 |
|---|---|---|---|
| 1. Parts of Soya Oil Charged Agitate 420 r.p.m. and Bleed-in $CO_2$ at a rate of .04 cu. ft. per gal. | 340.5 | 340.5 | 340.5. |
| 2. Heat to 240° C. in | 28 min | 24 min | 24 min. |
| 3. Parts of Pentaerythritol Added | 35.4 | 44.8 | 38.7. |
| 4. Heat to 240° C. in | 4 min | 4 min | 4 min. |
| 5. Hold at 225° C. and Agitate for | 10 min | 12 min | 10 min. |
| 6. Parts of Litharge Added | 0.17 | 0.17 | 0.17. |
| 7. Parts of Pentaerythritol or Styrene-Allyl Alcohol Copolymer Added: | | | |
| (a) Pentaerythritol | 35.4 | | |
| (b) Styrene-Allyl Alcohol Copolymer | | 400 | 550 |
| 8. Heat to 225° C. and Hold | 75 min | 90 min | 75 min. |
| 9. Parts of Styrene-Allyl Alcohol Copolymer Added—Agitate Mins. | 150 | | |
| 10. Parts of Phthalic Anhydride Added—Stop $CO_2$ Bleed-in. | 148 | 148 | 148. |
| 11. Parts of Xylol Added | 35 | 46 | 53. |
| 12. Heat to | 220° C | 222° C | 230° C. |
| 13. In | 198 min | 155 min | 90 min. |
| 14. Hold | | | 24 min. |
| 15. Thin with: | | | |
| (a) Varsol | 624 | | |
| (b) Xylol | | 870 | 1,005. |
| Water off (parts) | 17 | 19 | 20. |

The above compositions are tested and are found to have the following physical properties:

| Physical Properties | #1 | #2 | #3 |
|---|---|---|---|
| Viscosity, Gardner-Holdt | $Z_2$–$Z_3$ [1] | U | T–U. |
| Solids | 50 | 50 | 50. |
| Acid No. (solids) | 9.7 | 12.6 | 12.3. |
| Color, Gardner | 4 | 5 | 4. |
| Appearance | Clear | Clear | Clear. |

In Example I, there are three runs showing different levels of pentaerythritol replacement by the styrene-allyl alcohol copolymeric polyol. This replacement serves to reduce the percent soya oil content to 50, 37 and 33 percent by weight for runs 1, 2 and 3, respectively. In the discussion of oil content, a short oil alkyd is generally understood to mean an alkyd containing 40% by weight or less oil content. Medium is considered to be about 50% by weight while long oil alkyds are generally considered to be 60% by weight or above in oil content. The percent excess OH over the phthalic anhydride equivalent and the styrene-allyl alcohol copolymer fraction of non-oil for the three runs in Example I is shown in the following Table I:

TABLE I

|  | #1 | #2 | #3 |
|---|---|---|---|
| Percent Soya Oil Content | 50 | 37 | 33 |
| Percent Excess OH on Phthalic | 25 | 30 | 48 |
| Styrene-Allyl Alcohol Copolymer Fraction of Non-oil | 44 | 70 | 78 |

The effect on the physical properties with increasing styrene-allyl alcohol copolymer replacement is clearly shown in the tabulation of physical properties shown in Example I, particularly with regard to viscosities and acid number. The viscosity results particularly set forth the balancing of viscosities that is possible in the practice of this invention, which results in optimum and improved formulation and application properties while eliminating gelation during preparation.

*Example II*

| Formula | Parts by Weight | | |
|---|---|---|---|
|  | #1 | #2 | #3 |
| Soya Oil | 340.5 | 340.5 | 340.5 |
| Glycerine | 62 | 39.2 | 24.7 |
| Phthalic Anhydride | 148 | 148 | 148 |
| Styrene-Allyl Alcohol Copolymer (equivalent weight=300±15) | 150 | 400 | 550 |
| Litharge | 0.17 | 0.17 | 0.17 |
| Water Loss (theoretical) | 18 | 18 | 18 |
| Yield (theoretical) | 682.67 | 909.87 | 1,045.37 |

The process steps used for the three formulations above are carried out in a heated, closed agitated reaction vessel. The following process steps are carried out in sequence:

| Process | #1 | #2 | #3 |
|---|---|---|---|
| 1. Parts of Soya Oil Charged—Agitate 420 r.p.m. and Bleed-in $CO_2$ at a rate of .04 cu. ft. per gal. | 340.5 | 340.5 | 340.5 |
| 2. Heat to 225° C. in | 7 min | 46 min | 17 min. |
| 3. Parts of Glycerine Added | 62 | 39.2 | 24.7 |
| 4. Heat to 225° C. in | 7 min | 5 min | 11 min. |
| 5. Hold at 225° C. and Agitate for | 18 mi | 10 min | 10 min. |
| 6. Parts of Litharge Added | 0.17 | 0.17 | 0.17 |
| 7. Styrene-Allyl Alcohol Copolymer Added | 150 | 400 | 550. |
| 8. Heat to 225° C. and Hold | 90 min | 140 min | 75 min. |
| 9. Parts of Phthalic Anhydride Added—Stop $CO_2$ Bleed-in. | 148 | 148 | 148. |
| 10. Parts of Xylol Added | 34 | 52.5 | 52.5. |
| 11. Heat to 212° C. in | 128 min | 55 min | 110 min. |
| 12. Hold | 115 min | 120 min |  |
| 13. Thin with: |  |  |  |
| (a) Varsol | 649 |  |  |
| (b) Xylol |  | 857.5 | 991.7. |
| Water off (parts) | 17.5 | 18 | 19. |

The above compositions are tested and are found to have the following physical properties:

| Physical Properties | #1 | #2 | #3 |
|---|---|---|---|
| Viscosity, Gardner-Holdt | D | E-F | G. |
| Solids, percent | 50 | 50 | 50. |
| Acid No. (solids) | 8.2 | 12.5 | 13.6. |
| Color, Gardner | 5.5 | 5.0 | 4.0. |
| Appearance | Sl. Haze | Clear | Clear. |

The percent OH on the phthalic anhydride and the styrene-allyl alcohol copolymer fraction of non-oil for the three runs in Example II is shown in the following Table II.

TABLE II

|  | #1 | #2 | #3 |
|---|---|---|---|
| Percent Soya Oil Content | 50 | 37 | 32 |
| Percent Excess OH on Phthalic | 25 | 30 | 32 |
| Styrene-Allyl Alcohol Copolymer Fraction of Non-oil | 44 | 70 | 78 |

The alkyds of the three runs of Example II were made using glycerine instead of the pentaerythritol of Example I. As can readily be seen from the physical properties tabulated in Example II, the viscosity development did not progress nearly as far as those based on the pentaerythritol polyol. As a result, the alkyd resins of Example I will contribute to a paint superior formulation and application properties for a majority of uses over those of Example II.

*Example III*

| Formula | Parts by Weight | |
|---|---|---|
|  | #1 | #2 |
| Soya Oil | 340 | 340 |
| Isophthalic Acid | 115 | 115 |
| Pentaerythritol | 55 | 55 |
| Styrene-Allyl Alcohol Copolymer (equivalent weight=300±15) | 194 | 145 |
| Litharge | 0.24 | 0.24 |
| Water Loss (theoretical) | 25 | 25 |
| Yield (theoretical) | 679.24 | 630.24 |

The process steps used for the two formulations above are carried out in a heated, agitated reaction vessel. The following process steps are carried out in sequence:

| Process | #1 | #2 |
|---|---|---|
| 1. Parts of Soya Oil Charged—Agitate 420 r.p.m. and Bleed-in $CO_2$ at a rate of .04 cu. ft. per gal. | 340 | 340. |
| 2. Parts of Litharge Added | 0.24 | 0.24. |
| 3. Heat to 205° C. in | 26 min | 26 min. |
| 4. Parts of Pentaerythritol Added | 55 | 55. |
| 5. Heat to 246° C. for | 16 min | 16 min. |
| 6. Hold at 246° C. for | 30 min | 30 min. |
| 7. Cool to 205° C. in | 7 min | 10 min. |
| 8. Parts of Isophthalic Acid Added | 115 | 115. |
| 9. Parts of Varsol or Xylol Added: |  |  |
| (a) Varsol | 2.9 |  |
| (b) Xylol |  | 2.9. |
| 10. Heat to 224° C. in | 27 min | 20 min. |
| 11. Azeotrope between 255-275° C. for | 4 hrs. 32 min | 4 hrs. 40 min. |
| 12. Cool to 225° C. in | 12 min | 10 min. |
| 13. Parts of Styrene-Allyl Alcohol Copolymer Added. | 194 | 145. |
| 14. Parts of Varsol or Xylol Added: |  |  |
| (a) Varsol | 19 |  |
| (b) Xylol |  | 19. |
| 15. Reheat to 204° C. in | 12 min | 12 min. |
| 16. Azeotrope at 225° C. for | 1 hr. 30 min | 1 hr. 20 min. |
| 17. Thin with | Varsol-2 | Varsol-2. |
| Total Water off | 29.5 | 26.7. |

The above compositions are tested and are found to have the following physical properties:

| Physical Properties | #1 | #2 |
|---|---|---|
| Final Solids | 50 | 50. |
| Viscosity, Gardner-Holdt | R | R-S. |
| Acid No. (solids) | 2.8 | 1.7. |
| Color, Gardner | 5 | 5. |
| Appearance, filtered | Clear | Clear. |
| Appearance, unfiltered | Slight cloud | Slight cloud. |

Whereas short and medium oil content alkyds, employing pentaerythritol or higher, non-resinous polyhydric alcohols, have in the past employed diols, with their inherent tendency to sacrifice film quality to avoid gelation caused by the high functionality of the pentaerythritol and higher polyhydric alcohols, the use of styrene-allyl alcohol copolymers as part of the polyol makes possible non-gelling short oil coesters employing pentaerythritol and/or higher polyhydric alcohols alcohols with dicarboxylic acids and/or anhydrides. Stoichiometric replacement of polyol, or its extension with styrene-allyl alcohol copolymers, which have high equivalent weight, markedly lower oil content in accordance with the level of polyol replacement or extension. Outstanding performance is had by the principle of supplementing the viscosity retardation influence of the styrene-allyl alcohol copolymer with the viscosity acceleration influence of pentaerythritol or higher polyhydric alcohols permitting realization of their combined advantages in a short to medium oil alkyd without reporting to low functional polyols or acids in order to avoid gelation.

Example III demonstrates a procedure employing extension of the polyol with styrene-allyl alcohol copolymer. In effect, a very long (70% by weight of oil) alkyd is processed with the styrene-allyl alcohol copolymeric polyol to effect an ester interchange in sufficient amount to reduce the oil content as desired. The extension technique as shown in this example generally results in a higher excess hydroxyl (see the following Table III) than those employing the technique involving partial replacement of polyol with styrene-allyl alcohol copolymer (see Table I).

TABLE III
[Composition of Example II]

| | #1 | #2 |
|---|---|---|
| Percent Soya Oil | 50 | 53 |
| Percent Excess OH on Isophthalic | 59 | 47 |
| Styrene-Allyl Alcohol Copolymer Fraction of Non-oil | 57 | 50 |

A preferred procedure for the preparation of these coesters is to form a long oil alkyd from pentaerythritol and a dicarboxylic acid and subsequently modifying the long oil alkyd with the styrene-allyl alcohol copolymeric polyol to convert the overall composition into a short to medium alkyd. This procedure is generally set forth in Example III. In this example, a triglyceride (soya oil) is used but, if desired, fatty acids or a mixture of fatty acids and triglycerides may be employed in place of the soya oil.

When vegetable or animal oils are used to modifying the alkyd, it is generally preferable in most instances to heat the oil under a blanket of inert gas to prevent darkening. The oil and polyhydric alcohol are heated together above the melting point of the polyol in the range of temperatures from 200–275° C., preferably 225–250° C., and in the presence of a suitable catalyst such as litharge or lime to form the many various glycerides of the fatty acids. This step is generally referred to as an oil alcoholysis.

The water formed during the subsequent reaction involving polycarboxylic acids is preferably removed at the time it is being formed. The removal of the water may be accomplished by any suitable means such as distillation and the like.

When air-drying or rapidly curing resins are desired, semi-drying or drying oils or fatty acids derived from such oils are used. Examples of semi-drying oils would be soya bean, palm, corn, cotton seed, rape seed, sesame, etc., oils or acids derived therefrom. Fatty oils may also be used such as, for example, linseed, tung, dehydrated castor, China-wood, safflower, oiticia, perilla, sunflower seed, etc. oils. These latter oils may be used exclusively or with the semi-drying oils. In addition, either mixed fatty acids derived from such oils or individual fatty acids, e.g., saturated or unsaturated aliphatic or monocarboxylic acids, may be employed. Unsaturated aliphatic monocarboxylic acids and especially the poly-unsaturated aliphatic monocarboxylic acids, e.g., linoleic, linolenic, eleostearic, etc., are preferred when resinous compositions having optimum air-drying characteristics are desired. For the purposes of my invention, I prefer to use saturated or unsaturated high molecular weight carboxylic acids which contain from about 8 to 24 carbon atoms. In summary, the alkyd modifier may be selected from a wide range of oils or triglycerides, fatty acids, mono- and higher esters between polyhydric alcohols and fatty acids and mixtures of the same. To prevent brittleness and/or gelation which may result at low modifier contents and to permit optimum use of the styrene-allyl alcohol copolymer, the amount of alkyd modifier used in the reaction should be limited to 25 to 60 percent and preferably to 30 to 52 percent.

The polyhydric alcohols used in the preparation of the alkyds of this invention are those containing at least 4 available hydroxyl groups. Illustrative examples of such alcohols are polyglycerol, pentaerythritol, polypentaerythritol, polyallyl alcohol, polymethallyl alcohol, erythritol, arabitol, xylitol, mannitol and the like. The preferred polyhydric alcohols to be used in the preparation of the alkyds are the aliphatic or aromatic alcohols of 4 to 6 hydroxyl groups and containing from 4 to 14 carbon atoms such as pentaerythritol, dipentaerythritol and polypentaerythritol, sorbitol and dulcitol, which are considered highly functional in nature. The quantity of non-resinous polyhydric alcohol used in the reaction will generally range from 3 to 25 percent. For optimum chemical resistance, water resistance and viscosity development, the preferable range is 3 to 20 percent and more preferably 3 to 15 percent.

The polycarboxylic acids used in the preparation of the novel alkyds may be any of those generally employed in the preparation of this type of resin. These acids may possess two, three, four, or more carboxyl groups and may be aliphatic, alicyclic, heterocyclic, or aromatic and may be saturated or unsaturated. Examples of such acids are malonic, glutaric, succinic, suberic, citric, tricarballylic, cyclohexanedicarboxylic, maleic, fumaric, itaconic, citraconic, mesaconic, phthalic, isophthalic, terephthalic 1,8-naphthalenic, adipic, sebacic, azelaic, pimelic, chlorosuccinic, bromomalic, dichlorophthalic, dihydroacrylic, trimellitic, pyromellitic and benzophenon-2,4'-dicarboxylic acid.

The preferred polycarboxylic acids to be used in producing the novel alkyds are the dicarboxylic acids containing from 2 to 12 carbon atoms, such as succinic, glutaric, adipic, suberic, maleic, ortho-phthalic, or its anhydride, isophthalic, and the like. Particularly preferred polycarboxylic acids are the aromatic dicarboxylic acids, containing from 6 to 10 carbon atoms wherein the two carboxyl groups are attached directly to the aromatic nucleus. Isophthalic acid is a particularly preferred aromatic dicarboxylic acid because of its superior properties with respect to solvent resistance and other desirable properties. In some cases it may be desirable to utilize other forms of the acids, such as the acid anhydrides or acid chlorides, as phthalic anhydride, maleic anhydride, succinic chloride, and the like. The quantity of the polycarboxylic acid used in the reaction will generally range from 5 to 40 percent and more preferably from 8 to 25 percent for a more optimum balancing of properties.

The styrene-allyl alcohol copolymers of this invention are copolymers of allyl or methallyl alcohol or mixtures thereof and a styrene compound containing from about 4.0–10% hydroxyl groups by weight. In place of the styrene may be substituted alpha-methyl styrene or ring-substituted styrenes in which the substituent groups are alkyl or chloro groups, or both. Examples of such ring-substituted styrene compounds include the ortho-, para-, and meta-, methyl, ethyl, butyl, etc., mono-alkyl styrenes; ortho-para and ortho-meta dimethyl, diethyl, etc., styrenes; mono-, di- and tri-chlorostyrenes such as 2, 4-dichlorostyrene, etc.; alkylchlorostyrenes such as 2- methyl-4-chlorostyrene, 2,6-dimethyl-4-chlorostyrene, 2,6-diethyl-4-chlorostyrene, etc. Mixtures of 2 or more styrene compounds may also be used.

The preferred copolymerized polyol is a styrene-allyl alcohol copolymer having an equivalent weight of 300±130 and a hydroxyl content between 4.0 to 10.0% and more preferably a styrene-allyl alcohol copolymer having an equivalent weight of 300±15 and a hydroxyl content between 5.4 to 6.0%. The styrene-allyl alcohol copolymer has a high equivalent weight in proportion to its hydroxyl content and therefore will automatically reduce oil content of an alkyd in accordance with the level of polyol replacement. When the styrene-allyl alcohol copolymer is esterfied with fatty acids it provides coating vehicles generally equal to or better than corresponding epoxy esters in water, detergent chemical and corrosive resistance. Adhesion, drying efficiency, color retention are also equal to or better than corresponding epoxy esters. In addition, the use of styrene-allyl alcohol copolymers as a partial replacement for the polyol in alkyds leads to coesters possessing all of the above-mentioned advantages plus marked improvement over the conventional fatty acid esters of styrene-allyl alcohol copolymers in film flexibility, exterior durability, solvent resistance and economics. The styrene-allyl alcohol copolymers may be prepared in several ways. However, it is most desirable to copolymerize the styrene and allyl alcohol components in a substantially oxygen-free system, thus minimizing the oxidative loss of hydroxyl groups (see U.S. 2,894,938). It is especially preferred to employ styrene-allyl alcohol copolymers containing a relatively uniform distribution of hydroxyl groups.

As stated above, this invention permits combining in an alkyd resin the superior gloss, gloss retention, drying, adhesion, chemical and corrosion resistance associated with styrene-allyl alcohol copolymer fatty acid esters, together with the superior color, solvent resistance, chemical resistance and durability associated with pentaerythritol alkyds. It permits such combination by either the fatty acid or the oil alcoholysis routes, each with either the polyol replacement or extension technique. It enables maximum quality at lowest cost. It provides coesters having properties superior to either the unmodified alkyd or the unmodified styrene-allyl alcohol copolymer fatty acid esters. These coesters may be solvent-dispersed or emulsified to "water in oil" emulsions. They have enabled the development of superior appliance and architectural enamels, superior automotive primers and topcoats, superior appliance primers and superior binders for textile printing. As seen by the above uses, the alkyd resins of this invention are particularly useful in applications where hard, corrosive-resistant, chemical-resistant films are desired. They are generally compatible with urea-formaldehyde resins, melamine-formaldehyde resins, urea-melamine-formaldehyde resins, cellulose derivative, cellulose esters, e.g., cellulose nitrate, etc., and with many other materials, yielding compositions having improved properties over the unmodified material.

It is obvious that many variations may be made in the products and processes set forth above without departing from the spirit and scope of this invention.

What is claimed is:
1. A short to medium oil alkyd resin comprising the reaction product of 3 to 25% by weight of a polyhydric alcohol having the functionality of at least 4 reactive hydroxyl groups, 5 to 40% by weight of a polycarboxylic anhydride, 10 to 60% by weight of a styrene-allyl alcohol copolymeric polyol and between 25 to 60% by weight of an alkyd modifier selected from the group consisting of fatty acids, mono- and higher esters between polyhydric alcohols and fatty acids, and mixtures of the same.

2. The short to medium oil alkyd resin as in claim 1 wherein the styrene-allyl alcohol copolymeric polyol has an equivalent weight of 300±130 and a hydroxyl content between 4.0 to 10.0%.

3. The short to medium oil alkyd resin as in claim 1 wherein the styrene-allyl alcohol copolymeric polyol has an equivalent weight of 300±15 and a hydroxyl content between 5.4 to 6% by weight of the polyol.

4. The process of preparing a short to medium oil alkyd resin which comprises the steps of heating in a reaction vessel, in the presence of a catalyst, a mixture of from 25 to 60% by weight of an oil and from 3 to 25% by weight of a polyhydric alcohol having a functionality of at least 4 reactive hydroxyl groups, adding to said mixture from 10 to 60% by weight of a styrene-allyl alcohol copolymer and from 5 to 40% by weight of a polycarboxylic acid, the total of all components listed above being 100% by weight.

5. The process of preparing a short to medium oil alkyd resin which comprises the steps of heating in a reaction vessel in the presence of a catalyst a mixture of from 25 to 60% by weight of an oil and from 3 to 25% by weight of a polyhydric alcohol having a functionality of at least 4 reactive hydroxyl groups, adding to said mixture from 5 to 40% by weight of a polycarboxylic acid, azeotroping at elevated temperatures, adding from 10 to 60% by weight of a styrene-allyl alcohol copolymer, and further azeotroping to form an oil-modified alkyd having an oil content of 25 to 60%, the total of all components listed above being 100% by weight.

References Cited by the Examiner

UNITED STATES PATENTS

| 2,630,430 | 3/1953 | Shokal et al. | 260—881 |
| 2,977,333 | 3/1961 | Runk et al. | 260—20 |

FOREIGN PATENTS 629,410 10/1961 Canada.

OTHER REFERENCES

"Paint, Oil and Chemical Review," February 10, 1955, pages 10–17, copy in 260–22.

LEON J. BERCOVITZ, *Primary Examiner.*

ALFONSO D. SULLIVAN, *Examiner.*

J. W. BEHRINGER, R. W. GRIFFIN,
*Assistant Examiners.*